(12) United States Patent
Theobald

(10) Patent No.: US 9,849,800 B1
(45) Date of Patent: Dec. 26, 2017

(54) TRANSFERRING ENERGY BETWEEN A MOBILE UNIT AND ANOTHER DISCRETE UNIT

(71) Applicant: Vecna Technologies, Inc., Cambridge, MA (US)

(72) Inventor: Daniel Theobald, Somerville, MA (US)

( * ) Notice: Subject to any disclaimer, the term of this patent is extended or adjusted under 35 U.S.C. 154(b) by 495 days.

(21) Appl. No.: 14/340,155

(22) Filed: Jul. 24, 2014

(51) Int. Cl.
*B60L 11/18* (2006.01)
*B60R 16/033* (2006.01)

(52) U.S. Cl.
CPC ........ *B60L 11/1842* (2013.01); *B60R 16/033* (2013.01)

(58) Field of Classification Search
CPC ............................ B60L 11/1842; B60R 16/033
See application file for complete search history.

(56) References Cited

U.S. PATENT DOCUMENTS

| 2008/0149403 A1* | 6/2008 | Fein ........................ | B60K 16/00 180/2.2 |
| 2015/0260835 A1* | 9/2015 | Widmer .................. | G01S 13/04 342/27 |

* cited by examiner

*Primary Examiner* — Jared Fureman
*Assistant Examiner* — Rafael Pacheco
(74) *Attorney, Agent, or Firm* — Albert J. Brunett

(57) ABSTRACT

Methods, systems and devices are provided for transferring energy between a mobile unit and another discrete unit. One such method involves a mobile unit configured as a vehicle. During this method, energy is stored with an energy storage configured with the vehicle. At least some of the stored energy is transferred from the energy storage to an energy receiver using an energy transmitter, where the vehicle is discrete from the energy receiver.

7 Claims, 3 Drawing Sheets

TRANSFERRING ENERGY BETWEEN A MOBILE UNIT AND ANOTHER DISCRETE UNIT

BACKGROUND OF THE INVENTION

1. Technical Field

This disclosure relates generally to a mobile unit and, more particularly, to methods, systems and devices for transferring energy between a mobile unit and another discrete unit.

2. Background Information

An electric vehicle may be used for moving cargo within an operating environment. The term "cargo" may describe animate as well as inanimate objects including, but not limited to, passengers, packages, equipment, etc. A typical electric vehicle includes an energy storage system and a drive system. The energy storage system may store electrical energy received from an electrical grid while the vehicle is parked and the energy storage system is connected to an electrical outlet by a cord. The energy storage system may subsequently provide the stored electrical energy to the drive system. The drive system may convert the received electrical energy into mechanical energy for moving the vehicle through its operating environment.

SUMMARY OF THE DISCLOSURE

Methods, systems and devices are provided for transferring energy between a mobile unit and another discrete unit. One such method involves a mobile unit configured as a vehicle. During this method, energy is stored with an energy storage configured with the vehicle. At least some of the stored energy is transferred from the energy storage to an energy receiver using an energy transmitter, where the vehicle is discrete from the energy receiver.

BRIEF DESCRIPTION OF THE DRAWINGS

The following detailed description will be better understood when read in conjunction with the appended drawings, in which there is shown one or more embodiments of the present disclosure. It should be understood, however, that the various embodiments of the present disclosure are not limited to the precise arrangements and instrumentalities shown in the drawings.

DETAILED DESCRIPTION

Figure 1:
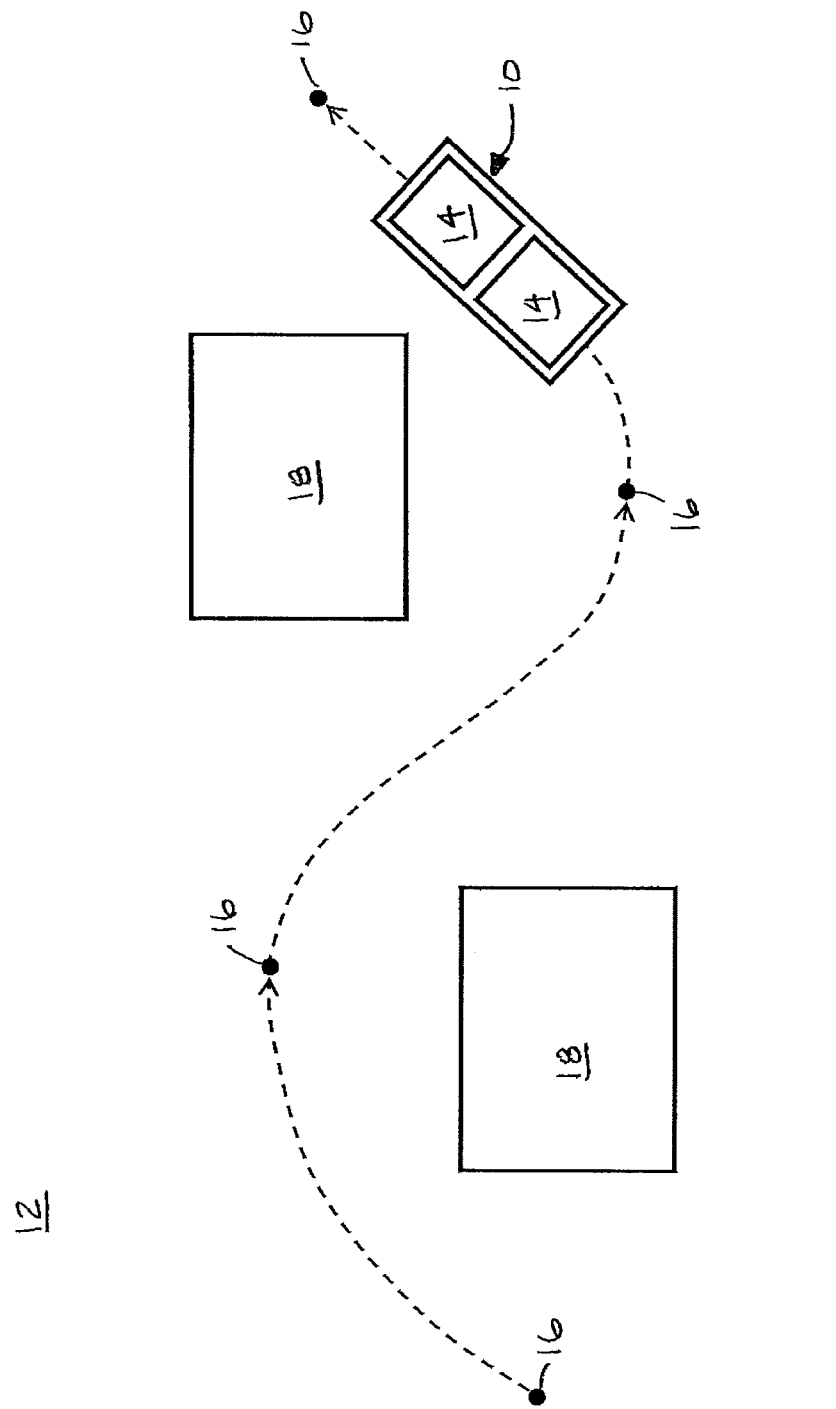
FIG. 1 is a schematic illustration of a mobile unit moving within an operating environment.

FIG. 1 illustrates a mobile unit 10 moving within an operating environment 12. This mobile unit 10 is configured to perform one or more tasks within the operating environment 12. The mobile unit 10, for example, may be configured for moving animate and/or inanimate cargo 14 (e.g., passenger(s), package(s), equipment, etc.) between a plurality of locations 16 and/or around one or more obstacles 18. The present disclosure, however, is not limited to performing any particular task(s) with the mobile unit 10. For example, the mobile unit 10 may be configured with a manipulator for manipulating an object or objects; e.g., reconfiguring, reorienting and/or relocating the cargo 14.

Examples of the mobile unit 10 include an automobile, a motorcycle, a truck, a bus, a train, a forklift, a tractor, a recreational vehicle (RV), an aircraft, a spacecraft, a boat, a submersible, a cable car (e.g., gondola), or any other type of personal, commercial, industrial and/or government vehicle. Another example of the mobile unit 10 is a mobile robot; e.g., an autonomous mobile robot. Still other examples of the mobile unit 10 include a container (e.g., a shipping container), a trailer, a rail car and a barge. While the present disclosure is not limited to any particular type of mobile unit, the mobile unit 10 of FIG. 1 is described below and referred to as a "solar vehicle" for ease of description.

Figure 2:
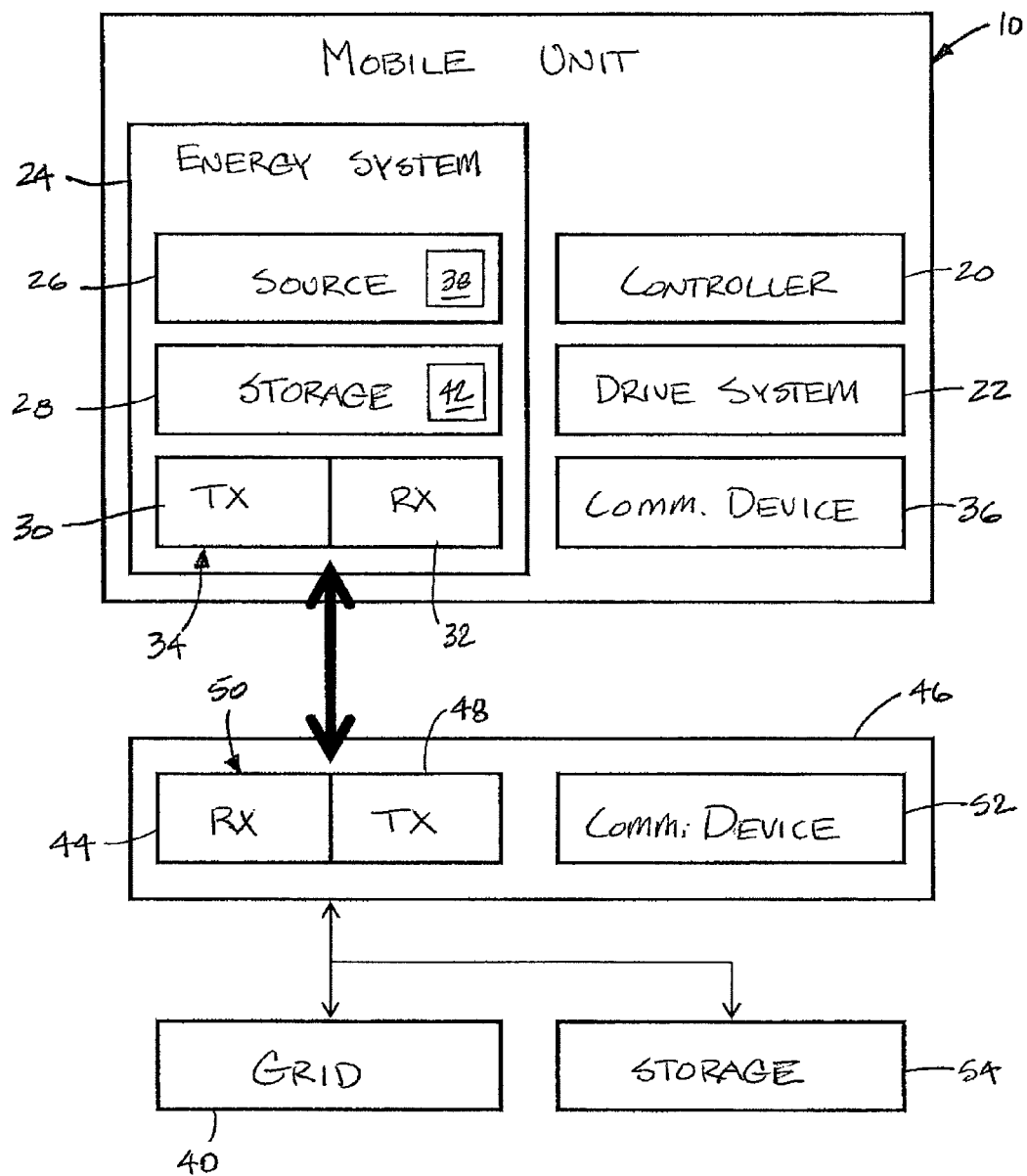
FIG. 2 is a block diagram of a mobile unit temporarily electrically coupled and in communication with discrete devices and systems.

Referring to FIG. 2, the solar vehicle 10 includes a controller 20, a drive system 22 and an energy system 24. The energy system 24 includes an energy source 26, an energy storage 28 and an energy transmitter 30.

The controller 20 is in signal communication (e.g., hardwired and/or wirelessly connected) with one or more of the mobile unit components 22, 24, 26, 28, 30, 32, 34 and/or 36. The controller 20 may be implemented with a combination of hardware and software. The hardware may include memory and a processing system, which may include one or more single-core and/or multi-core processors. The hardware may also or alternatively include analog and/or digital circuitry other than that described above.

The memory is configured to store software (e.g., program instructions) for execution by the processing device, which software execution may control and/or facilitate performance of one or more operations such as those described below. The memory may be a non-transitory computer readable medium. For example, the memory may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The drive system 22 is configured for moving the solar vehicle 10 within its operating environment 12 (see FIG. 1). The drive system 22 may include, for example, one or more propulsion devices (e.g., drive wheels, propellers, etc.) which receive torque from at least one motor. This motor may be configured as an electric motor that converts electrical energy into mechanical energy for driving the propulsion device(s). Such an electric motor may receive at least some or all of the electrical energy from the energy system 24; e.g., the energy source 26 and/or the energy storage 28. Alternatively, the motor may be configured as a combustion engine which converts chemical energy stored in fuel into mechanical energy for driving the propulsion device(s). Still alternatively, the drive system 22 may include both an electric motor and a combustion engine for selectively driving the propulsion device(s). The present disclosure, however, is not limited to any particular drive system configurations or methods of propelling or otherwise moving the mobile unit 10. Furthermore, in some embodiments, the mobile unit 10 may be configured without a drive system where, for example, the mobile unit 10 is configured as a container, a trailer, a rail car or a barge.

The energy source 26 is configured to generate electrical energy and provide at least some of the generated electrical energy to the energy storage 28. The energy source 26 may also be configured to provide some of the generated electrical energy to one or more other components and/or systems of the solar vehicle 10; e.g., the drive system 22, an entertainment system, a light system, an emergency system, an accessory system, etc.

The energy source 26 may be configured as or include one or more solar cells 38; e.g., photovoltaic cells. These solar cells 38 are configured to convert light energy into electrical energy. The solar cells 38 may be arranged in one or more arrays, which may be further configured in one or more solar panels. Such solar panels and, thus, solar cells 38 may be positioned on a roof, a hood and/or any other exterior portion of the solar vehicle 10. Of course, the present disclosure is not limited to any particular solar cell placement or arrangement. Furthermore, the present disclosure is not limited to any particular energy source configuration. For example, in some embodiments, the energy source 26 may also or alternatively include a generator that converts chemical or mechanical energy into electrical energy. The energy source 26, for example, may include an alternator connected to the combustion engine of the drive system 22. Another example of a suitable generator is disclosed in U.S. patent application Ser. No. 14/184,744 filed Feb. 20, 2014, which is hereby incorporated herein by reference in its entirety.

The energy storage 28 is configured to store electrical energy provided by the energy source 26. The energy storage 28 may also be configured to store electrical energy provided by another energy source. The energy storage 28, for example, may be configured to store electrical energy provided by an alternator connected to the combustion engine of the drive system 22. The energy storage 28 may also or alternatively be configured to store electrical energy provided by an electrical grid 40 to which the solar vehicle 10 may be periodically connected to as described below. The energy storage 28 may include one or more energy storage devices 42. Examples of an energy storage device 42 include, but are not limited to, a battery and a capacitor. The energy storage 28 and, thus, its energy storage devices 42 are configured with the solar vehicle 10; e.g., within a compartment of the mobile unit.

The energy transmitter 30 is configured to receive at least some or all of the stored electrical energy from the energy storage 28 and transfer this electrical energy to an energy receiver 44 that is discrete from the solar vehicle 10; e.g., the energy receiver 44 may be configured with a stationary terminal or unit 46 separate from the mobile unit 10. The energy transmitter 30 may also be configured to transfer the electrical energy received from the energy source 26 to the energy receiver 44.

The electrical energy may be transferred between the transmitter 30 and the receiver 44 through a hardwired connection. For example, the energy transmitter 30 may be connected to, include or be configured as an electrical cord that plugs into the energy receiver 44; e.g., an electrical outlet. Alternatively, the energy receiver 44 may be connected to, include or be configured as an electrical cord that plugs into the energy transmitter 30; e.g., an electrical outlet configured with the solar vehicle 10. The present disclosure, however, is not limited to foregoing exemplary hardwired connection configurations.

The energy transmitter 30 may also or alternatively be configured to wirelessly transfer the electrical energy to the energy receiver 44. The electrical energy may be transferred wirelessly, for example, through an electromagnetic field. Non-limiting examples of such an energy transmitter and such an energy receiver are disclosed in the above-referenced and incorporated U.S. patent application Ser. No. 14/184,744. With such a configuration, the solar vehicle 10 may advantageously transfer at least some of the electrical energy while the vehicle 10 is moving, or momentarily stopped near an energy receiver 44. Of course, the electrical energy may also be wirelessly transferred while the solar vehicle 10 is stopped for relatively long periods of time; e.g., parked.

In some embodiments, the energy transmitter 30 may be configured with an energy receiver 32 to provide an onboard energy transceiver 34. In this manner, electrical energy may be transferred from as well as to the solar vehicle 10. Similarly, the energy receiver 44 may be configured with an energy transmitter 48 to provide another energy transceiver 50 located discrete of the vehicle 10. The present disclosure, of course, is not limited to the foregoing exemplary energy transmitter, receiver or transceiver configurations.

It is worth noting, the energy receiver 44 (or transceiver 50) may be electrically coupled with and configured to provide at least some or all of the received electrical energy to the electrical grid 40. The term "electrical grid" may describe an interconnected network of power lines, transformers, transfer stations, etc. that electrically couple at least one energy provider (e.g., a coal, gas or nuclear power plant) to one or more energy consumers (e.g., businesses, households, etc.). Surplus electrical energy generated and stored by the solar vehicle 10 during operation and/or during rest periods (e.g., when parked) therefore may be provided to the electrical grid 40. The owner or operator of the solar vehicle 10 may receive compensation for the electrical energy provided to the electrical grid 40, which may serve to reduce the cost of solar vehicle 10 operation. The transfer of electrical energy may also or alternatively return surplus electrical energy that may have been received from the electrical grid 40 before operation. The owner or operator of the solar vehicle 10 may similarly receive compensation (e.g., a refund) for the returned electrical energy.

In some embodiments, the controller 20 may be connected to a communication device 36 configured with the solar vehicle 10. This communication device 36 may be configured to communicate data with another communication device 52 discrete from the vehicle 10. Such data may be indicative of an identity of the owner or operator of the solar vehicle 10. The data may also or alternatively be indicative of a quantity of electrical energy transferred from the energy transmitter 30 to the energy receiver 44. Using this data, an energy provider may adjust the electric bill and/or pay the owner or operator of the solar vehicle 10 for the received electrical energy. Of course, there are various other methods and systems for tracking and/or compensating for transferred electrical energy, and the present disclosure is not limited to any particular ones thereof. Furthermore, in some embodiments, the energy receiver 44 may also or alternatively provide the received electrical energy to another energy storage 54 arranged discrete from the solar vehicle 10.

In some embodiments, the electrical energy may be transferred from the energy transmitter 30 to the energy receiver 44 once the quantity of energy stored with the energy storage 28 rises above a certain threshold. In some embodiments, the electrical energy may be transferred from the energy transmitter 30 to the energy receiver 44 where the solar vehicle 10 is going to be parked or non-operational for a prolonged period of time. In some embodiments, the electrical energy may be transferred from the energy transmitter 30 to the energy receiver 44 each time the energy transmitter 30 and the energy receiver 44 are electrically coupled.

In some embodiments, a select portion of the electrical energy stored with the energy storage 28 may be transferred between the energy transmitter 30 and the energy receiver 44. In this manner, the solar vehicle 10 and, more particularly, the energy storage 28 may maintain a "base charge". In some embodiments, substantially all of the electrical energy stored with the energy storage 28 may be transferred between the energy transmitter 30 and the energy receiver 44. In still other embodiments, while the solar vehicle 10 is stationary or not being used, the controller 20 may direct a select portion or all of the electrical energy generated by the source to the energy transmitter 30 for transfer and, for example, bypass the energy storage 28. In this manner, the solar vehicle 10 may function as a temporary energy source for the electrical grid 40 and/or the energy storage 54. This may be particularly advantageous where the energy storage 54 is not connected to the electrical grid 40 and/or there is a power outage with the electrical grid 40.

In some embodiments, one or more components of the solar vehicle 10 other than the energy transmitter 30 or the drive system 22 may receive at least some of the electrical energy stored by the energy storage 28. The energy storage 28, for example, may provide at least some of the stored electrical energy to a system discrete of the drive system 22; e.g., an entertainment system, a light system, an emergency system, an accessory system, etc. In some such embodiments, the energy storage 28 may be electrically decoupled from the drive system 22; e.g., the energy system 24 may configured for critical or non-critical vehicle accessories.

Figure 3:
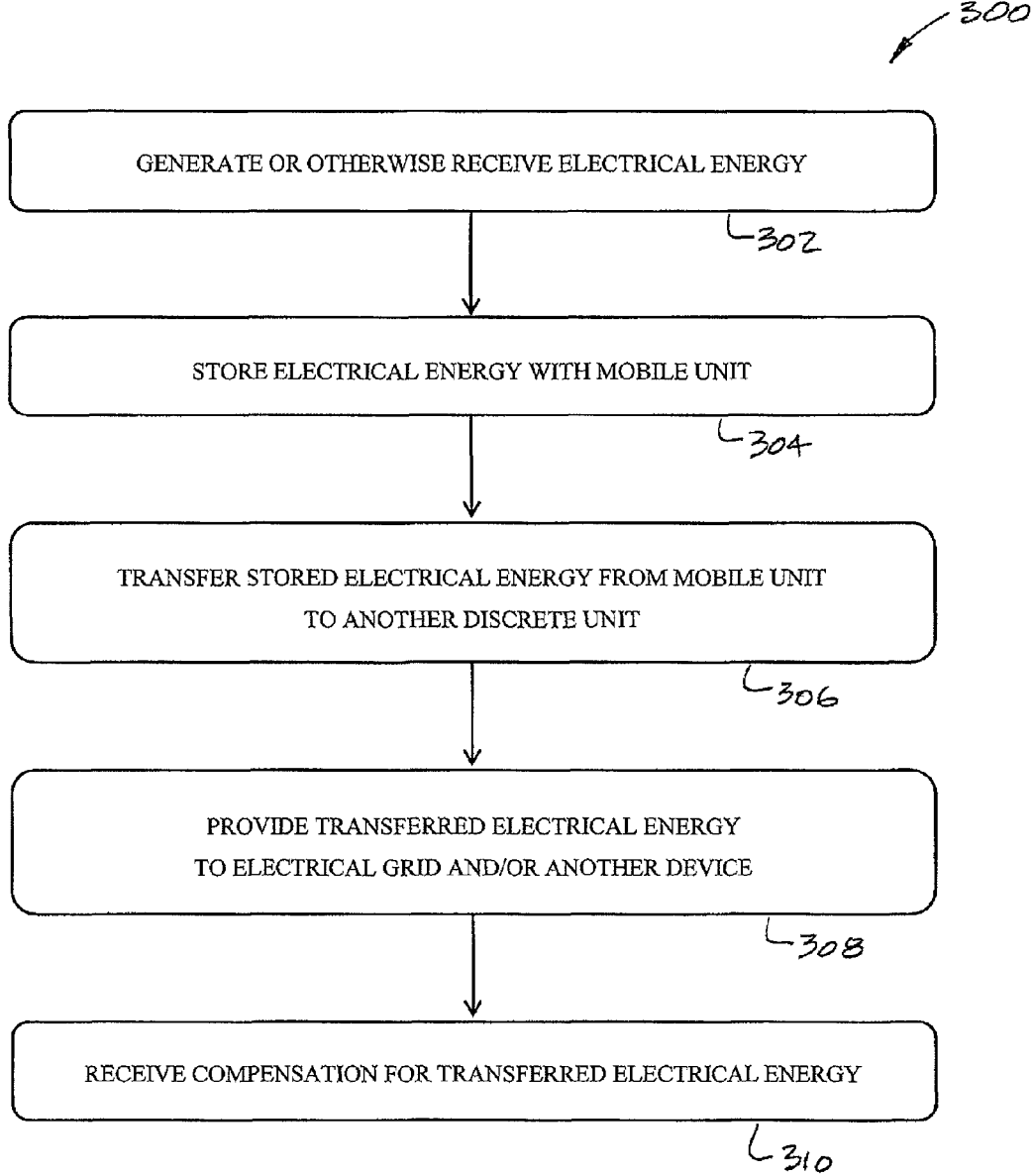
FIG. 3 is a flow diagram of a method involving a mobile unit.

FIG. 3 is a flow diagram of a method 300 involving a mobile unit such as the solar vehicle 10 of FIGS. 1 and 2. While this method 300 is described below with reference to the solar vehicle 10, the method 300 of FIG. 3 is not limited to any particular mobile device configuration.

In step 302, the energy source 26 generates electrical energy. The energy source 26, for example, may utilize its one or more solar cells 38 to convert light energy into the electrical energy. The energy source 26 may generate the electrical energy while the solar vehicle 10 is moving within its operating environment 12. The energy source 26 may also or alternatively generate the electrical energy while the solar vehicle 10 is stopped or parked.

In step 304, the energy storage 28 receives and stores electrical energy generated by the energy source 26. The energy storage 28 may receive and store all of the electrical energy generated by the energy source 26 where, for example, the energy storage 28 is electrically coupled serially between the energy source 26 and the other mobile unit 10 components. The energy storage 28 may alternatively store a select portion of the generated electrical energy where, for example, the remaining portion is provided directly to another mobile unit 10 component; e.g., the drive system 22. Of course, where those other mobile unit 10 components are non-operational or electrically decoupled by the controller 20 and/or the vehicle operator, the energy storage 28 may receive and store all of the generated electrical energy.

In step 306, electrical energy is transferred from the solar vehicle 10 to the energy receiver 44. More particularly, electrical energy stored with the energy storage 28 is transferred from the energy transmitter 30 to the energy receiver 44. This electrical energy may be transferred while the solar vehicle 10 is stopped or parked or components other than the energy transmitter 30 are non-operational, for example. The electrical energy may also or alternatively be transferred while the solar vehicle 10 is moving using, for example, an electromagnetic field.

The energy transmitter 30 may transfer a portion of the stored electrical energy to maintain a "base charge" with the energy storage 28 and/or maintain a minimum charge needed for operating one or more other mobile unit 10 components. Alternatively, the energy transmitter 30 may transfer all of the electrical energy stored with the energy storage 28 where, for example, the solar vehicle 10 is non-operational and/or being prepared for storage, service, etc.

In step 308, the energy receiver 44 provides the received transferred electrical energy to the electrical grid 40. In step 310, the owner and/or operator of the solar vehicle 10 receives compensation for the electrical energy received by the energy receiver 44 and/or provided to the electrical grid 40. The owner and/or operator, for example, may receive an electronic fund transfer, an energy credit, an electric bill refund, cash, etc. This compensation may be received approximately at the time of the energy transfer or subsequent to the energy transfer. The compensation may be received from an electricity provider, an owner and/or operator of the terminal or unit 46 with which the energy receiver 44 is configured, etc.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

Although the description above contains many specific examples, these should not be construed as limiting the scope of the embodiments of the present disclosure, but as merely providing illustrations of some of the presently preferred embodiments of the present invention. It will be appreciated by those skilled in the art that changes could be made to the embodiments described above without departing from the broad inventive concept thereof. It is to be understood therefore that this disclosure is not limited to the specific embodiments disclosed herein, but it is intended to cover modifications within the spirit and scope of the embodiments of the present disclosure. Accordingly, the present invention is not to be restricted except in light of the attached claims and their equivalents.

What is claimed is:

1. A method involving a solar powered mobile unit, the method comprising:

providing a solar powered mobile unit at least having a solar power energy source configured with the mobile unit as well as an energy transmitting member and a energy storage unit for storing the solar power generated by the solar power energy source, the mobile unit configured for moving cargo and/or one or more passengers;

providing an energy receiver discrete from the mobile unit for receiving a predetermined amount of energy from the energy storage unit via the energy transmitting member;

generating energy using the solar powered energy source configured with the mobile unit;

determining at a particular point in time whether the energy storage unit contains excess energy greater than a base charge that at least may be needed for an upcoming trip to be taken by the mobile unit; and transferring at least some of the excess energy to the energy receiver using the energy transmitter so that the energy receiver can in turn use such excess energy for other purposes while not preventing the upcoming trip.

2. The method as defined in claim 1, further comprising receiving compensation for the transferred energy.

3. The method as defined in claim 1, further comprising storing at least some of the energy with an energy storage configured with the mobile unit, wherein the transferring comprises transferring at least some of the stored energy to the energy receiver using the energy transmitter.

4. The method as defined in claim 1, wherein the mobile unit comprises a vehicle.

5. The method as defined in claim 1, wherein the energy transmitter is configured to be electrically coupled with the energy receiver through a hardwired connection.

6. The method as defined in claim 1, wherein the energy transmitter is operable to wirelessly transfer at least some of the stored energy to the energy receiver.

7. The method as defined in claim 4, including moving the vehicle from a first location to a second location, both determining and transferring being undertaken at the second location.

\* \* \* \* \*